Feb. 20, 1968  HANS-HERMANN KOEPPE ET AL  3,369,338

METHOD FOR MOUNTING A TRANSPARENCY IN A RESILIENT, FLEXIBLE FRAME

Filed June 24, 1963

INVENTORS
Hans-Hermann Koeppe
Otfried Urban
BY
Michael S. Striker
ATTY

United States Patent Office 3,369,338
Patented Feb. 20, 1968

3,369,338
METHOD FOR MOUNTING A TRANSPARENCY IN A RESILIENT, FLEXIBLE FRAME
Hans-Hermann Koeppe, Wiesbaden-Schierstein, and Otfried Urban, Medenbach, Taunus, Germany, assignors, by mesne assignments, to Geimuplast Peter Mundt KG., Garmisch-Partenkirchen, Germany, a corporation of Germany
Filed June 24, 1963, Ser. No. 290,142
Claims priority, application Germany, June 22, 1962, A 40,501/62
4 Claims. (Cl. 53—35)

ABSTRACT OF THE DISCLOSURE

A method for mounting a transparency in a resilient, flexible frame having a pair of substantially coextensive frame portions each provided with free unattached edges which are displaceable toward each other and having between said frame portions a slot through which a transparency may be introduced into said frame, the steps of displacing said free edges of said frame portions toward each other for bulging said frame portions away from each other to widen said slot; introducing the transparency into the frame through the thus-widened slot so as to reduce the possibility of marring the surface of the transparency during introduction thereof into the frame; and then releasing the frame for return to its unstressed condition so that the thus-introduced transparency will remain mounted in the frame.

---

The present invention relates to the mounting of transparencies in suitable frames.

At the present time it is possible to mount transparencies in frames by slipping the transparencies into the frames, and in order to precisely position the transparencies in the frames the frames are conventionally provided with one or more teeth which engage or snap behind an edge of the transparency to determine the location thereof in the frame. However, the great disadvantage of this type of structure is that it is hardly possible to avoid marring the surface of the transparency, as by scratching the same, during the mounting thereof in the frame. In order to avoid this drawback it has already been proposed to locate the transparency in a suitable protective envelope which is introduced with the transparency into the frame, whereupon the envelope alone is removed, but the disadvantage of this construction is that machines for automatically mounting the transparency in the frame become exceedingly complex because of the necessity of removing the protective envelope, and in any event it does not infrequently happen that the removal of the protective envelope results also in marring of the transparency surface.

It is accordingly a primary object of the present invention to provide a frame and a method for introducing the transparency into the frame in such a way that the above drawbacks will be avoided.

A further object of the present invention is to provide an exceedingly simple method for temporarily deforming a flexible frame in such a way that a transparency can be mounted therein without marring the surface thereof.

Also, it is an object of the invention to provide a frame which can be manipulated in a manner permitting a transparency to be mounted therein without marring the surface of the transparency.

An additional object of the invention is to provide a frame of this type which is inexpensive and simple.

With these objects in view the invention includes, in a method for mounting a transparency in a flexible resilient frame having a slot through which the transparency can be introduced into the frame, the steps of deforming the frame in opposition to its inherent resiliency in a manner which widens the slot beyond the width which this slot has when the frame is unstressed, introducing the transparency through the thus-widened slot into the frame so as to reduce the possibility of marring the surface of the transparency, and then releasing the frame so that it will spring back to its unstressed condition retaining the transparency therein.

Also, the frame of the invention includes a pair of flexible resilient substantially coextensive frame portions defining along an edge portion thereof a slot through which the transparency can be introduced into the frame, and these frame portions are capable of being bulged outwardly away from each other to widen the slot so that the transparency can be introduced while the slot is widened beyond the width it normally has when the frame portions are unstressed, and one of the frame portions has spacers extending toward and engaging the other of the frame portions to determine the positions of the frame portions relative to each other when they are unstressed.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 7:
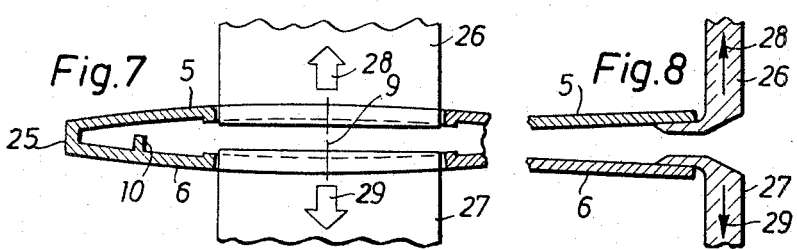
Figure 8:
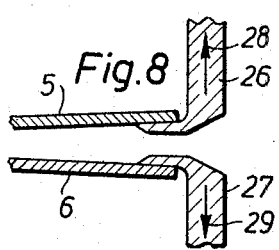

FIG. 7 is a fragmentary sectional view of still another embodiment of a frame according to the present invention, FIG. 7 also fragmentarily also illustrating jaws of a manually operable tong structure applied to the frame for deforming the latter in connection with the introduction of a transparency into the frame; and FIG. 8 is a transverse, fragmentary view of the structure of FIG. 7 showing further details of the jaws of FIG. 7.

Figure 1:
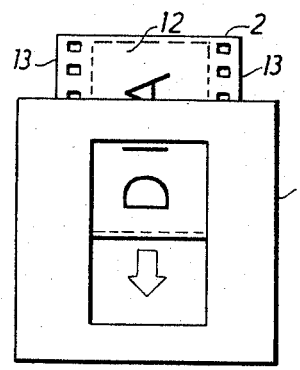
FIG. 1 is a diagrammatic plan view of the frame of the invention showing also a transparency during introduction thereof into the frame.
Figure 2:
FIG. 2 illustrates the edge portion of the frame of the invention which is provided with the slot through which the transparency is introduced into the frame.

Referring to FIG. 1, there is shown therein, in a diagrammatic manner, a frame 1 which, as is indicated in FIG. 2, is formed with a slot 4 through which a transparency 2 can be introduced into the frame by moving the transparency through the slot 4 with respect to the frame in the direction indicated by the arrow in FIG. 1.

Figure 3:
FIG. 3 is an enlarged sectional illustration of one embodiment of a frame according to the present invention.
Figure 4:
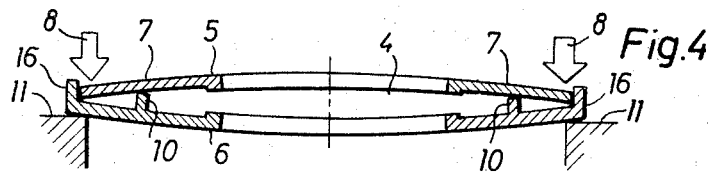
FIG. 4 shows part of the process of the invention for introducing the transparency into the frame of FIG. 3.

As may be seen from FIG. 3 the frame includes a pair of substantially coextensive frame portions 5 and 6 which are of a generally rectangular configuration and which are formed with aligned rectangular openings through which the picture carried by the transparency will be visible. The frame portions 5 and 6 are made of a resilient flexible material, such as any suitable plastic, cardboard, or the like, and these frame portions 5 and 6 are connected to each other with a suitable glue, or in the case of plastic frame portions, they may be fused to each other by applying heat to suitable parts of the frame portions so that these parts will flow into each other and upon solidification will unite the frame portions. In the illustrated example the frame portion 5 is substantially flat while the frame portion 6 has at its outer periphery a flanges 16 which may surround the outer periphery of the frame portion 5. The frame portion 6 integrally carries a pair of spacer ribs 10 which respectively extend parallel to the opposed side edges of the frame portion 6 which are shown at the right and left of FIG. 3. The surfaces of the ribs 10 distant from the frame portion 6 engage the inner surface of the frame portion 5 to determine the space between the frame portions, and the frame portion 5 is fused to the spacer ribs 10 so that it is through these ribs 10 that the frame portions are also connected to each other in the illustrated example. Thus, while the flange 16 of the frame portion 6 overlaps the periphery of the frame portion 5, this periphery of the frame portion 5 can be moved relative to the flange 16. The pair of ribs 10 and the parallel side edges of the frame portions extend perpendicularly with respect to the slot 4 which is defined between the frame portions in the manner indicated in FIG. 3. FIG. 4 shows at 7 the areas where the frame portions 5 and 6 are connected to each other.

The method of the invention which is illustrated in FIG. 4 involves placing the frame portion 6 on a pair of supports 11 which extend along the right and left edges of the frame, as viewed in FIG. 4, and which extend beneath the frame in the manner indicated in FIG. 4. With the frame thus mounted on the pair of supports 11 the operator need only depress the opposed side edges of the frame portion 5 toward the frame portion 6, so that the frame portions will be deformed in the manner indicated in FIG. 4 from which it is apparent that the forces 8 which extend perpendicularly to the plane to be occupied by the transparency bulge the frame portions 5 and 6 outwardly away from each other widening the slot 4 so that with the frame maintained in the condition illustrated in FIG. 4 the transparency can be slipped into the frame without any possibility of marring the surface thereof, particularly the surface where the picture is located, and after the transparency has been introduced into the frame the forces 8 can be removed so that the frame will spring back to its unstressed condition holding the transparency in the frame. It will be noted that with this arrangement the transparency need only engage the frame along the perforated side edges 13 of the transparency so that the picture area 12 thereof need never come in contact with the frame. The forces 8 may be applied either through the operator's fingers or with any suitable tool, and of course the method of FIG. 4 may be performed by a suitable machine. It will be noted that the forces 8 extend parallel to the optical axis 9.

During introduction of the transparency the portions of the space between the frame portions 5 and 6 where the edge portions 13 of the transparency are located are narrower than the portion of the slot which receives the part of the transparency between its perforated side edges, so that the transparency can be guided in the relatively narrow space portions which receive the side edge portions of the transparency, and once the transparency is properly positioned with the picture area thereof aligned with the central openings of the frame portions, the forces 8 are removed and the frame snaps back to its unstressed condition shown in FIG. 3. It is to be noted that the slot 4 is only shown diagrammatically in FIG. 2. The slot 4 is simply the result of the joining of the frame portions 5 and 6 to each other by the pair of parallel spacer ribs 10, and it will be noted that these frame portions are formed along their central openings with inwardly directed flanges providing the extremely narrow gap 4 extending all around the central openings of the frame portions. Thus, when the frame of FIG. 3 is placed in the condition shown in FIG. 4 the transparency can be introduced through either end of the frame since the gap or slot 4 will be widened in the manner shown in FIG. 4 along the entire length of the frame.

Figure 5:
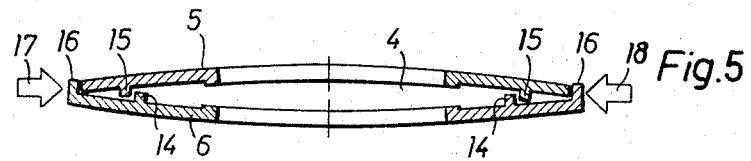
FIG. 5 is a sectional view of another embodiment of a frame according to the present invention, FIG. 5 also illustrating diagrammatically the manner in which the frame of FIG. 5 is acted upon according to the method of the invention for introducing a transparency into the frame.

The embodiment of the invention which is illustrated in FIG. 5 includes a pair of frame portions 5 and 6 similar to those of FIGS. 3 and 4 except that in the case of FIG. 5 the peripheral flange 16 of the lower frame portion 6 is fused to the opposed side edges of the frame portion 5 which are situated at the right and left of the frame portion 5, as viewed in FIG. 5. Of course, the flange 16 need not extend all around the periphery of the frame 5, and in fact in the examples illustrated in FIGS. 3–5 the flanges 16 are only located at the illustrated opposite side edges of the frame portion 16. Thus, with the construction of FIG. 5 it is only the opposed side edges of the frame portion 5 which are fused or glued to the pair of opposed flanges 16 of the frame portion 6. Thus, with this embodiment a pair of oppositely directed forces 17 and 18 can be applied to the flange portions 16 displacing them slightly toward each other so as to cause the frame portions 5 and 6 to bulge away from each other in the manner shown in FIG. 5 thus widening the slots or gap 4 to facilitate the introduction of the transparency from either end of the frame in the manner discussed above in connection with FIGS. 3 and 4.

With the embodiment of FIG. 5 the frame portion 6 has a pair of elongated parallel ribs 14 extending toward the frame portion 5, these ribs 14 being parallel to the flanges 16, while the frame portion 5 is integrally formed with a pair of longated parallel ribs 15 respectively parallel to the ribs 14 and respectively located between the latter and the flanges 16. These spacer ribs 14 and 15 thus limit the movement of the frame portions 5 and 6 toward each other when they return to their unstressed condition where they will have with respect to each other the relative position indicated in FIG. 3. Of course, the ribs 14 are not connected to the frame portion 5 and the ribs 15 are not connected to the frame portion 6, so that these ribs 14 and 15 function on the one hand as spacers and on the other hand to prevent the frame portions 5 and 6 from bulging inwardly toward each other when the forces 17 and 18 are applied to the flanges 16. These forces 17 and 18 may be applied by the fingers of one hand of the operator so that the other hand is free to introduce the transparency, or a suitable machine or tool may be provided for these purposes. It will be noted that with the method of FIG. 5 the forces applied to the frame are directed perpendicularly with respect to the optical axis.

Figure 6:
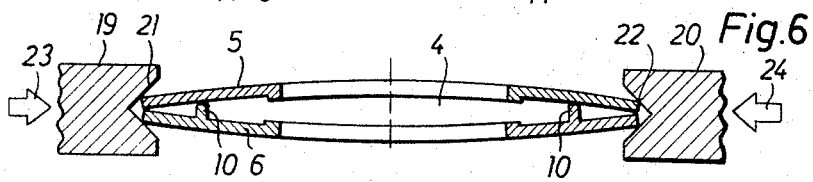
FIG. 6 shows, in a sectional view, still another embodiment of a frame according to the invention as well as part of a structure for acting on the frame to deform the latter in connection with the mounting of a transparency in the frame.

The frame of FIG. 6 is identical with that of FIG. 3 except that the lower frame portion 6 does not have any flanges 16. Thus, the frame portions 5 and 6 of FIG. 6 are fixed to each other by the pair of opposed parallel ribs 10 and in addition these ribs 10 limit the movement of the frame portions toward each other so that in their unstressed condition they will have the positions with respect to each other indicated in FIG. 3. Thus, with this embodiment each of the frame portions has a free peripheral edge, and these coextensive edges of the frame portions are spaced from each other all around the frame portions.

The method of FIG. 6 involves the use of a pair of spreader members 19 and 20 supported on any suitable support means for movement toward and away from each other, these spreader members 19 and 20 extending parallel to the opposed side edges of the frame which are situated to the right and left as viewed in FIG. 6. The spreader members 19 and 20 are respectively formed with elongated V-grooves 21 and 22 which are directed toward each other and which extend parallel to the opposed side edges of the frame, and when the spreader members 19 and 20 are in their rest positions displaced apart from each other by a distance greater than that illustrated in FIG. 6 the frame can be situated between the V-grooves 21 and 22, simply held in this position by the operator, for example. Then the operator will displace the spreader members 19 and 20 toward each other in the manner indicated by the arrows 23 and 24 shown in FIG. 6. Any suitable linkage which can be manually operated may be connected to the members 19 and 20 for displacing them toward each other in the manner indicated in FIG. 6, or one of the members 19 and 20 may be stationary while the other member is displaceable toward and away from the same to achieve the same results. It will be seen that during the reduction in the distance between the pair of members 19 and 20 the free edges at the opposite sides of each frame portion will be forced toward the innermost parts of the grooves 21 and 22 so that the oppositely inclined faces of these grooves displace the opposed side edges of the frame portions toward each other bulging the frame portions outwardly away from each other in the manner indicated in FIG. 6. With the frame in the position shown in FIG. 6 the transparency may be introduced either mechanically or manually, and then the displacement of one or the other of the members 19 and 20 in a direction opposite to that indicated by the arrows will release the frame portions which spring back to their initial unstressed conditions where they have with respect to each other the relationship indicated in FIG. 3 retaining the transparency in the frame by the resilient pressure exerted on the opposed faces of the transparency by the lips of the frame portions which extend along their central openings as described above and shown in FIG. 3.

With the embodiment of the invention which is illustrated in FIGS. 7 and 8, the frame portions 5 and 6 are connected to each other by a pair of opposed flanges 25 located at the right and left edges of the frame, as viewed in FIG. 7, and these flanges 25 are integral with the frame portions 5 and 6. The frame portion 6 carries a pair of elongated parallel ribs 10 which are parallel to the opposed connecting flanges 25 and which only engage the frame portion 5 so as to determine the space between the frame portions when they are in their unstressed condition. With this embodiment it is of course possible to use either the method of FIG. 5 or that of FIG. 6. It should be noted that the V-grooves of FIG. 6 even if they do not displace the edges of the frame portions toward each other, since they could not perform this function with the frame of FIG. 7, are nevertheless capable of displacing the opposite frame edges toward each other to produce the results indicated in FIGS. 5 and 6. Of course in the embodiments of FIGS. 5 and 7 where the frame portions are connected to each other only at their opposed side edges it is possible to widen the slots at the opposed ends of the frame to an extent greater than with the embodiments of FIGS. 4 and 6 since in these latter embodiments the ribs 10 connect the frame portions to each other along lines which are located closer to each other than the opposed side edges of the frame. In the embodiment of FIG. 5 the ribs 14 and 15 can respectively move away from the frame portions 5 and 6, while in the embodiment of FIG. 7 the ribs 10 can move away from the frame portion 5 so that with the embodiments of FIGS. 5 and 7 a greater widening of the slots at the ends of the frame is possible than with the embodiments of FIGS. 4 and 6 where the spacer ribs also connect the frame portions to each other.

With the embodiment of FIGS. 7 and 8, instead of using the methods illustrated in FIGS. 5 and 6, it is possible to use a hand tool in the form of tongs or pliers constructed in a well known manner so that when the operator applies pressure to the handles of the tool the jaws thereof move apart from each other. These jaws 26 and 27 have relatively narrow free end portions extending substantially perpendicularly with respect to the directions 28 and 29 in which the jaws are displaced respectively away from each other by manipulation of the hand tool, and these narrow portions of the jaws are introduced into the slot at one end of the frame whereupon the tool is manipulated to have its jaws 26 and 27 respectively displaced in the directions 28 and 29 so as to spread the frame portions 5 and 6 away from each other, thus widening the slot. With the frame maintained by the operator in the condition indicated in FIGS. 7 and 8 the operator can slip the transparency between the jaws and frame portions into the space between the latter aligning the picture with the openings of the frame portion whereupon the operator releases the hand tool so that its jaws are pulled toward each other, and the hand tool may be provided with a suitable spring for this purpose. The operator then withdraws the jaws from the slot and the frame portions 5 and 6 return to the position illustrated in FIG. 3 with respect to each other retaining the transparency in the frame.

While in the above description reference has been made to manual operations, it is of course possible to provide any machine which may be manually or automatically operated to effect the steps which are performed manually.

It will be noted that with the embodiment of FIGS. 7 and 8 the frame portions 5 and 6 are spread apart from each other at only one end of the frame so that at the opposite end of the frame the frame portions 5 and 6 are hardly displaced with respect to each other, and this feature facilitates the positioning of the transparency within the frame since the leading end of the transparency as it moves into the frame will encounter a substantially closed end of the frame. Of course, with the methods of FIGS. 4–6 it is not necessary to apply the forces indicated along the entire lengths of the opposed side edges of the frame. Thus, the forces 8 may be applied to the opposed side endges of the frame at one end thereof, and the same is true of the forces 17 and 18 of FIG. 5. As for FIG. 6, the spreader members 19 and 20 can have a length substantially less than the length of the opposed side edges of the frame and can also engage the latter at one end thereof to spread the slot 4 at one end of the frame, so that in this way the frame will be deformed with the embodiment of FIGS. 4–6 in substantially the same way as with the embodiment of FIGS. 7 and 8.

It will be understood that each of the elements described above, or two or more together, may also find a useful application in other types of transparency mountings differing from the types described above.

While the invention has been illustrated and described as embodied in transparency frames and methods of manipulating the same, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, farily constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A method for mounting a transparency in a resilient, flexible frame having a pair of substantially coextensive frame portions each provided with free unattached edges which are displaceable toward each other and having between said frame portions a slot through which a transparency may be introduced into said frame, the steps of displacing said free edges of said frame portions toward each other for bulging said frame portions away from each other to widen said slot; introducing the transparency into the frame through the thus-widened slot so as to reduce the possibility of marring the surface of the transparency during introduction thereof into the frame; and then releasing the frame for return to its unstressed condition so that the thus-introduced transparency will remain mounted in the frame.

2. A method as recited in claim 1 and wherein said edge portions are displaced toward each other by application to said edge portions of forces extending perpendicularly with respect to the plane occupied by the transparency in the frame along parts of said edge portions which extend perpendicularly to the slot.

3. A method as recited in claim 1 and wherein said edge portions are displaced toward each other by applying to opposed parts thereof which extend perpendicularly to the slot oppositely directed forces substantially in the plane occupied by the transparency when it is in the frame and acting in directions which displace said parts of said edge portions toward each other.

4. A method as recited in claim 3 and wherein said oppositely directed forces are applied to a pair of members respectively having elongated V-grooves in which said parts of said frame edge portions are located.

References Cited
UNITED STATES PATENTS

| | | | |
|---|---|---|---|
| 1,436,644 | 11/1922 | Bricken | 53—35 |
| 1,716,783 | 6/1929 | Latimer | 53—35 |
| 2,330,292 | 9/1943 | Knight | 40—152 |
| 2,390,053 | 12/1945 | Bradford | 40—152 |
| 2,810,999 | 10/1957 | Spriggs | 53—188 |
| 2,892,295 | 6/1959 | McArthur | 53—123 |
| 2,999,344 | 9/1961 | Clanin et al. | 53—374 X |

TRAVIS S. McGEHEE, *Primary Examiner.*

J. SCHMALL, FRANK E. BAILEY, *Examiners.*

W. CORTRERAS, R. L. FARRIS, *Assistant Examiners.*